(No Model.)
G. S. NILES.
CAT BARRIER.
No. 504,936. Patented Sept. 12, 1893.
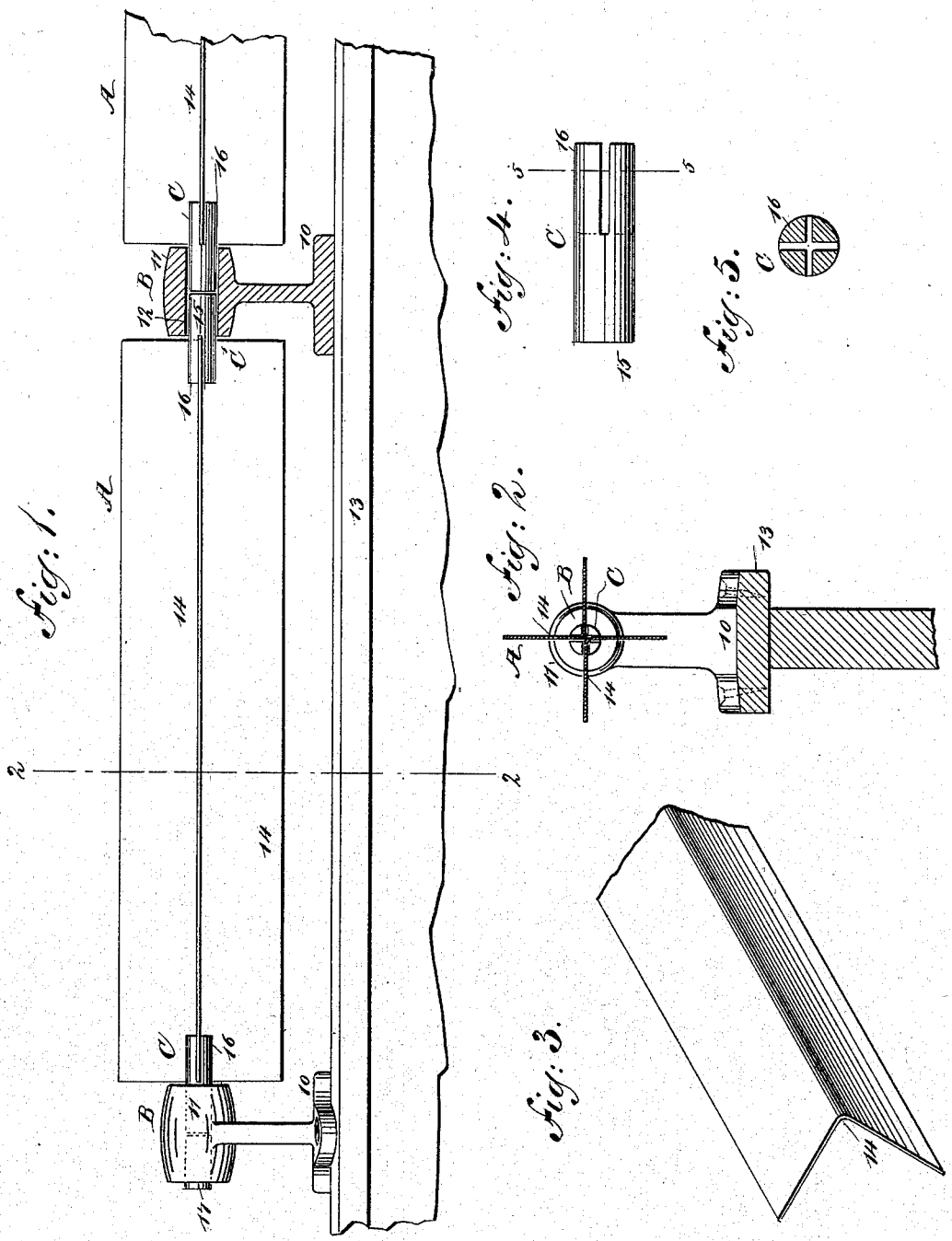
WITNESSES:
Chas. Nida
C. Sedgwick
INVENTOR
G. S. Niles
BY
Munn & Co.
ATTORNEYS.

UNITED STATES PATENT OFFICE.

GEORGE S. NILES, OF BROOKLYN, NEW YORK.

CAT-BARRIER.

SPECIFICATION forming part of Letters Patent No. 504,936, dated September 12, 1893.

Application filed May 27, 1893. Serial No. 475,724. (No model.)

*To all whom it may concern:*

Be it known that I, GEORGE S. NILES, of Brooklyn, in the county of Kings and State of New York, have invented a new and Improved Cat-Barrier, of which the following is a full, clear, and exact description.

My invention relates to a cat barrier, and it has for its object to provide a device especially adapted to be secured upon a fence, walls, or like partitions, the device being so constructed as to prevent a cat or like animal from walking along a fence, or standing or sitting thereon, and likewise preventing such an animal from obtaining a purchase upon the fence enabling it to jump thereon.

Another feature of the invention is to provide a device which may be conveniently run along a line of fence, a wall, or other partition, and which will be exceedingly simple and economic.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of a portion of the barrier, one of the bearings being shown in section. Fig. 2 is a vertical section taken practically on the line 2—2 of Fig. 1. Fig. 3 is a detail perspective view of a portion of one of the blades of the barrier. Fig. 4 is a detail side elevation of one of the trunnions; and Fig. 5 is a section taken transversely through a trunnion, practically on the line 5—5 of Fig. 4.

The device may be said to consist substantially of a wheel A of any desired length, and bearings B in which the trunnions C of the wheel sections turn. The bearings may be of any suitable character; preferably, however, they are made as shown in the drawings, in which they are shown as cast, and as comprising an essentially T-base 10 and a head 11 provided with a longitudinal bore 12, extending through from one end to the other. The bearings are secured to the top rail 13 of the fence by means of screws, nails, or equivalent fastening devices, and between opposing bearings a wheel section of the barrier is located. The wheel sections are of much greater length than diameter, their diameters being preferably made such that the blades will not extend much, if any, beyond the side edges of the top rail. The wheel sections are preferably made up of two or more, usually two blade sections 14. Each blade section is angular, or practically L-shaped in cross section, as shown in Fig. 3; and when two such sections are placed back to back, their contracted or angular edges being parallel, a wheel will be formed of four blades, as shown best in Fig. 2.

There is no necessity of securing the blade sections together by rivets, bolts, or other like fastening devices, since the trunnions C, are employed for that purpose; and to that end, the trunnions C, as shown in Figs. 4 and 5, comprise a solid section 15, which extends from one end to a point at or near the center, and an opposite slotted section 16, the slots in the slotted section being produced diametrically, one crossing the other as shown in Fig. 5. In fact, the formation of the slots in the slotted section of the trunnions corresponds to the cross sectional shape of the body of the wheel; and in building up the barrier the blade sections are introduced into the slots of the trunnions, as shown in Fig. 2, and the trunnions are then introduced into the heads of the bearings B. The heads of the bearings are made sufficiently long to accommodate the solid ends of two trunnions, as shown in the sectional bearing in Fig. 1; and in this manner a continuous line of barrier may be made, extending for any desired distance; and the bearings may be made angular instead of straight, the angular bearings being located for example at the corners of the fence or wall. When a single trunnion is entered in one bearing, the unfilled portion of its bore is usually closed by means of an inserted plug 17.

A wheel will readily revolve when touched; therefore, if an animal should attempt to jump upon a fence thus protected, it must necessarily strike the wheel section of the barrier, and obtaining no purchase on the wheel the animal must drop back to the surface from which it sprung. Furthermore, an animal can not well walk along a fence when fitted with the improved barrier. Even should the animal straddle the wheel sections, in attempting to walk the blades of the wheel sections would disturb its equilibrium and cause it to fall.

It is evident that it is impossible for an animal to sit upon the fence when the barrier is used; and it may be here remarked that the bearings are so small at their head portions that an animal such as a cat could not obtain purchase thereon, since the opposing ends of the wheel sections would decidedly interfere.

Having thus described my invention, I claim as new and desire to secure by Letters Patent—

1. A cat barrier, the same consisting of a wheel comprising blade sections angular in cross section and of a predetermined length, the sections being placed with their angular surfaces back to back, and trunnions slotted to receive the angular blade sections, whereby the sections are bound together, and any one section may be removed and replaced, as and for the purpose set forth.

2. A cat barrier, the same consisting of bearings adapted to be secured upon a fence, wall or like partition, a bladed wheel located between the bearings, said wheel comprising blade sections angular in cross section and of predetermined length, said sections having their angular surfaces placed face to face, and trunnions mounted in the bearings, which trunnions are provided with openings into which the extremities of the blade sections are introduced, as and for the purpose specified.

GEORGE S. NILES.

Witnesses:
 WM. C. HUSTED,
 THOMAS J. SCOTT.